(12) United States Patent
Mancini et al.

(10) Patent No.: US 9,630,369 B2
(45) Date of Patent: *Apr. 25, 2017

(54) PROCESS AND APPARATUS FOR MANUFACTURING TYRES

(75) Inventors: Gianni Mancini, Milan (IT); Gaetano Lo Presti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 702 days.

This patent is subject to a terminal disclaimer.

(21) Appl. No.: 12/449,398

(22) PCT Filed: Feb. 15, 2007

(86) PCT No.: PCT/IB2007/050498
§ 371 (c)(1),
(2), (4) Date: Aug. 6, 2009

(87) PCT Pub. No.: WO2008/099236
PCT Pub. Date: Aug. 21, 2008

(65) Prior Publication Data
US 2010/0024959 A1 Feb. 4, 2010

(51) Int. Cl.
*B29D 30/24* (2006.01)
*B29D 30/26* (2006.01)
(Continued)

(52) U.S. Cl.
CPC ........... *B29D 30/245* (2013.01); *B29D 30/26* (2013.01); *B29D 30/32* (2013.01); *B29D 2030/202* (2013.01); *B29D 2030/3214* (2013.01)

(58) Field of Classification Search
CPC B29D 30/0016; B29D 30/005; B29D 30/242; B29D 30/245; B29D 30/32;
(Continued)

(56) References Cited

U.S. PATENT DOCUMENTS 2,045,545 A * 6/1936 Shook ........................... 156/133
2,814,331 A * 11/1957 Vanzo et al. .................. 156/130
(Continued)

FOREIGN PATENT DOCUMENTS

EP 0 468 738 A2 1/1992
EP 0 943 421 11/1997
(Continued)

OTHER PUBLICATIONS

"Communication pursuant to Article 94(3) EPC", Office Action issued by the European Patent Office dated Nov. 10, 2010 in corresponding European Application No. 07 705 890.7-2307.
(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A carcass ply is applied around an outer surface of a building drum, according to an application diameter greater than the fitting diameter of the tire. An annular anchoring structure defining the fitting diameter is coaxially engaged around each of the end flaps. An outer sleeve including at least one belt structure possibly associated with a tread band is disposed at a coaxially centered position around the carcass sleeve applied onto the building drum. Through axial approaching of two halves forming the building drum, the carcass sleeve is shaped into a toroidal configuration to determine application of same against a radially internal surface of the outer sleeve.

108 Claims, 5 Drawing Sheets

(51) Int. Cl.
*B29D 30/32* (2006.01)
*B29D 30/20* (2006.01)

(58) Field of Classification Search
CPC ...... B29D 2030/0022; B29D 2030/202; B29D 2030/2664; B29D 2030/3214
USPC ........ 156/111, 117, 130–132, 396, 397, 398, 156/415, 417, 416
See application file for complete search history.

(56) References Cited

U.S. PATENT DOCUMENTS

| | | | | |
|---|---|---|---|---|
| 3,718,520 | A | * | 2/1973 | Leblond ............... B29D 30/245 |
| 3,728,194 | A | * | 4/1973 | Enders .......................... 156/400 |
| 3,740,293 | A | * | 6/1973 | Jones et al. .................... 156/415 |
| 3,746,598 | A | * | 7/1973 | Nebout .......................... 156/400 |
| 3,826,297 | A | | 7/1974 | Alderfer |
| 3,990,931 | A | | 11/1976 | Leblond et al. |
| 4,131,500 | A | * | 12/1978 | Wilde .................. B29D 30/247 156/131 |
| 4,636,277 | A | | 1/1987 | Owen et al. |
| 5,164,035 | A | * | 11/1992 | Nakajima et al. ............ 156/415 |
| 5,248,357 | A | | 9/1993 | Miyanaga et al. |
| 5,268,057 | A | | 12/1993 | Nojiri et al. |
| 6,328,084 | B1 | | 12/2001 | Caretta et al. |
| 6,390,166 | B1 | | 5/2002 | Roberts et al. |
| 6,475,319 | B1 | | 11/2002 | Akiyama |
| 7,128,117 | B2 | | 10/2006 | Currie et al. |
| 2003/0041975 | A1 | | 3/2003 | Evangelista et al. |
| 2005/0161141 | A1 | * | 7/2005 | Nakagawa .................... 152/546 |
| 2005/0224159 | A1 | * | 10/2005 | Suda ............................. 156/123 |
| 2005/0274449 | A1 | | 12/2005 | Tokunaga |
| 2006/0021692 | A1 | * | 2/2006 | Miki ............................. 156/117 |
| 2006/0130959 | A1 | | 6/2006 | Lacagnina |

FOREIGN PATENT DOCUMENTS

| | | |
|---|---|---|
| EP | 0 997 263 A2 | 5/2000 |
| EP | 1 510 330 A1 | 3/2005 |
| JP | 03-187728 | 8/1991 |
| JP | H6-75932 | 9/1994 |
| JP | 11-268151 | 10/1999 |
| JP | 2002-254529 | 9/2002 |
| JP | 2006-505424 | 2/2006 |
| JP | 2006-248163 A * | 9/2006 |
| KR | 10-0532680 | 4/2009 |
| WO | WO 02/094545 A1 | 11/2002 |
| WO | WO 2004/041520 A1 | 5/2004 |
| WO | WO-2005/011967 A1 * | 2/2005 |
| WO | WO 2005/123371 A1 | 12/2005 |

OTHER PUBLICATIONS

Official Action with English language translation issued by the Russian Patent Office on Feb. 2, 2011, in corresponding Russian Application No. 2009129259/12(040745).
Notice of Reasons for Rejection issued by Japan Patent Office on Jun. 15, 2012 in corresponding Application No. JP 2009-649851 (6 pages).
English-language translation of Notice of Reasons for Rejection issued by Japan Patent Office on Jun. 15, 2012 in corresponding Application No. JP 2009-649851 (7 pages).
Decision of Rejection issued by Japan Patent Office on Jan. 18, 2013 in corresponding Application No. JP 2009-549851 (2 pages).
English-language translation of Decision of Rejection issued by Japan Patent Office on Jan. 18, 2013 in corresponding Application No. JP 2009-549851 (3 pages).
State Intellectual Property Office of The People's Republic of China Notification of First Office Action issued Mar. 19, 2012, Chinese Application No. 200780051001.7.
Notice of Preliminary Rejection issued by Korean Patent Office on Jun. 18, 2013 in corresponding Application No. 10-2009-7015967.

* cited by examiner

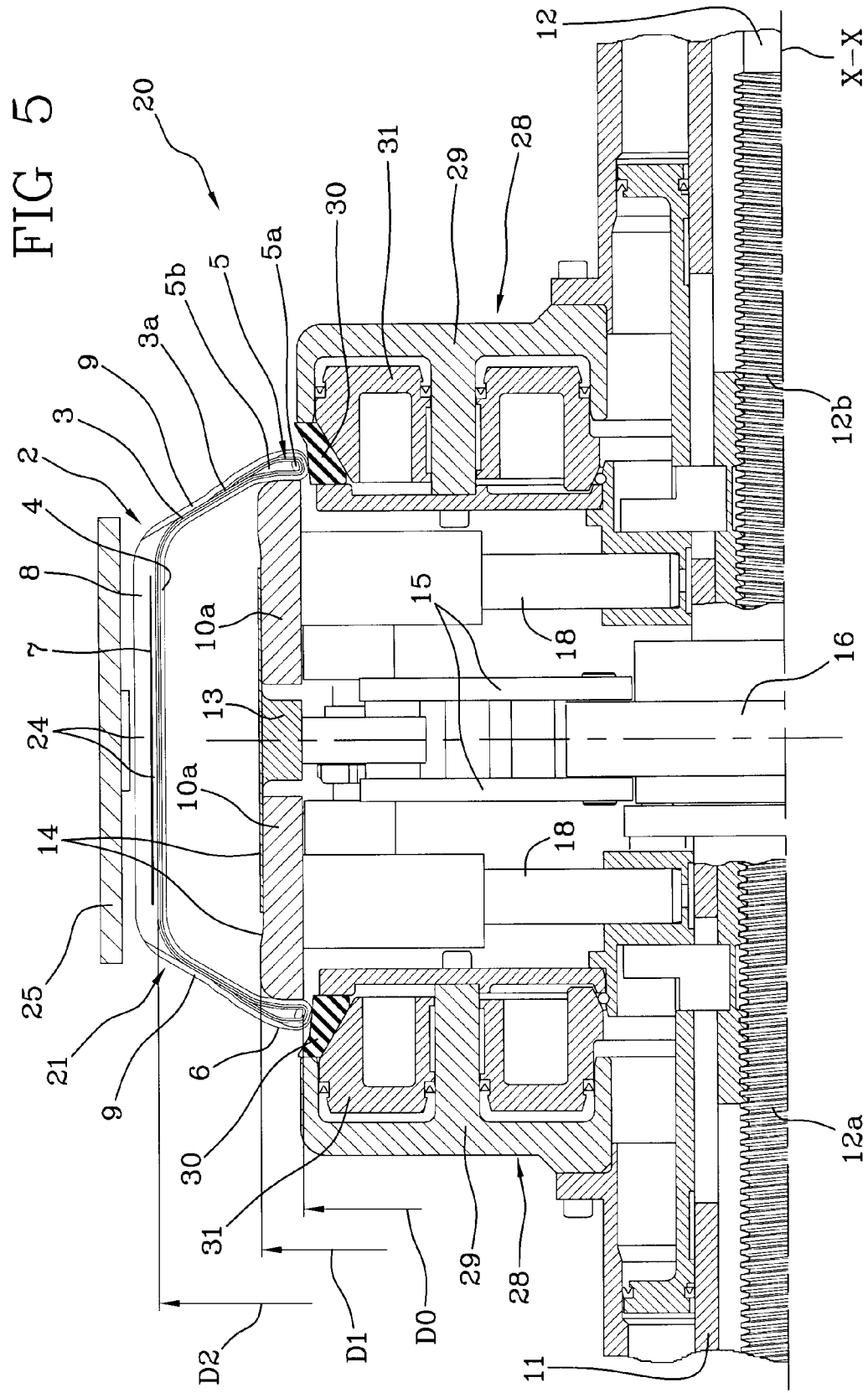

PROCESS AND APPARATUS FOR MANUFACTURING TYRES

CROSS REFERENCE TO RELATED APPLICATION

This application is a national phase application based on PCT/IB2007/050498, filed Feb. 15, 2007, the content of which is incorporated herein by reference.

BACKGROUND OF THE INVENTION

Field of the Invention

The present invention relates to a process and an apparatus for manufacturing tyres.

More particularly, the invention is specifically directed to the process and equipment used for building green tyres, to be subsequently submitted to a vulcanisation cycle, thereby obtained the final product.

Description of Related Art

A tyre for vehicle wheels generally comprises a carcass structure including at least one carcass ply having respectively opposite end flaps in engagement with respective annular anchoring structures, integrated into the regions usually identified as "beads", which have an inner diameter substantially corresponding to a so-called "fitting diameter" of the tyre on a respective mounting rim.

Associated with the carcass structure is a belt structure comprising one or more belt layers, located in radial superposed relationship with each other and with the carcass ply and having textile or metallic reinforcing cords with a crossed orientation and/or substantially parallel to the circumferential extension direction of the tyre. A tread band is applied to the belt structure at a radially external position, which tread band too is made of elastomeric material like other semifinished products constituting the tyre.

In addition, respective sidewalls of elastomeric material are applied to the side surfaces of the carcass structure, each extending from one of the side edges of the tread band until close to the respective annular anchoring structure to the beads. In tyres of the "tubeless" type, an air-tight coating layer, usually referred to as "liner" covers the inner surfaces of the tyre.

Subsequently to building of the green tyre carried out through assembly of the respective components, a moulding and vulcanisation treatment is generally carried out; it aims at causing structural stabilisation of the tyre through cross-linking of the elastomeric compositions and also at imprinting a desired tread pattern therein, as well as possible distinctive graphic marks at the tyre sidewalls.

The carcass structure and belt structure are generally made separately of each other in respective work stations, to be mutually assembled at a later time.

In more detail, manufacture of the carcass structure first contemplates application of the carcass ply or plies onto a building drum, to form a so-called "carcass sleeve" that is substantially cylindrical. The annular anchoring structures to the beads are fitted or formed on the opposite end flaps of the carcass ply or plies that are subsequently turned up around the annular structures themselves so as to enclose them in a loop.

Simultaneously, on a second or auxiliary drum a so-called "outer sleeve" is made which comprises the belt layers mutually applied in radially superposed relationship, and possibly the tread band applied at a radially external position to the belt layers. The outer sleeve is then picked up from the auxiliary drum to be coupled to the carcass sleeve. To this aim the outer sleeve is disposed coaxially around the carcass sleeve and afterwards the carcass ply or plies are shaped into a toroidal configuration by mutual axial approaching of the beads and simultaneous admission of fluid under pressure to the inside of the carcass sleeve, so as to determine radial expansion of the carcass plies until causing adhesion of same against the inner surface of the outer sleeve.

Assembling of the carcass sleeve to the outer sleeve can be carried out on the same drum as used for manufacture of the carcass sleeve, in which case reference is made to a "unistage building process".

Also known are building processes of the so-called "two-stage" type in which a so-called "first-stage drum" is employed to make the carcass sleeve, while assembly between the carcass structure and outer sleeve is carried out on a so-called "second-stage drum" or "shaping drum" onto which the carcass sleeve picked up from the first-stage drum, and subsequently the outer sleeve picked up from the auxiliary drum are transferred.

U.S. Pat. No. 3,990,931 discloses a unistage building process in which a radially expandable drum is used to cause engagement of the carcass structure at the annular anchoring structures, and contractible in an axial direction to give rise to the conformation of the carcass ply following admission of fluid between the carcass ply and the drum itself. The building process therein described further shows that the fitting diameter internally defined by the annular anchoring structures of the tyre under processing is greater than the diameter of application of the carcass ply onto said drum.

U.S. Pat. No. 7,128,117 discloses a first-stage drum provided with a central portion and two end portions located at axially opposite positions relative to the central portion. The central portion is circumferentially divided into radially movable sectors to expand the central portion between a contracted position and a radially expanded position. The carcass sleeve formed on the first-stage drum has the annular reinforcing structures fitted on the drum end portions, carrying respective inflatable turning-up bags in axial abutment relationship against the central portion provided in the radially expanded condition for support of the carcass plies.

U.S. Pat. No. 6,390,166 discloses a first-stage drum in which the end portions are radially expandable and contractible together with the central portion, to enable engagement and removal of the carcass sleeve, and axially movable close to and away from each other to adapt the axial size of the drum to the width of the tyre being manufactured.

U.S. Pat. No. 3,826,297 contemplates use of a dismountable first-stage drum to enable disengagement of the carcass sleeve previously formed by positioning annular anchoring structures against side shoulders provided on the drum, and subsequently forming the carcass ply or plies through application of circumferentially consecutive strip-like elements to cover the circumferential extension of the first-stage drum.

SUMMARY OF THE INVENTION

According to the present invention, the problem that the Applicant wishes to tackle is how to avoid transport of a carcass sleeve and how to reduce deformation of the tyre under processing, in particular during the shaping step.

In accordance with the present invention the Applicant has found that by combining a unistage process with an application surface of the semifinished products forming the carcass structure with a greater diameter than the fitting diameter of the tyre under processing, tyres of improved quality can be obtained.

More specifically, in a first aspect the present invention relates to a process for building tyres, comprising the steps of:

applying at least one carcass ply around at least one outer surface of a building drum having an application diameter, said at least one carcass ply having axially opposite end flaps;

coaxially engaging around each of the end flaps, an annular anchoring structure defining a fitting diameter smaller than said application diameter so as to make a carcass sleeve;

positioning an outer sleeve comprising at least one belt structure at a coaxially centred position around said carcass sleeve applied onto said building drum;

shaping said carcass sleeve into a toroidal configuration to determine application of same against a radially internal surface of said outer sleeve.

It is the Applicant's opinion that application of the carcass plies according to an application diameter greater than the fitting diameter gives rise to an important reduction in the deformations imposed to the carcass plies in order to enable radial expansion of same until reaching the outer sleeve during the shaping step.

The Applicant has verified that in this way it is possible to achieve more evenness in distributing the cords forming the carcass plies in the radially external regions of the tyre, which effect is particularly apparent in high and ultra high performance low-section tyres (this effect is deemed to be also present in tyres not of the low-section type, even if it can be detected less easily).

Here and in the following of the present description, by low-section tyre it is intended a tyre having a reduced section ratio, i.e. in which the section height, measured between the radially outermost point of the tread band and the radially innermost point of the bead, is less than about 50% of the section width axially measured at the point of maximum chord of the tyre. More specifically, in the present context tyres considered as low-section tyres will be those in which the section height is included between about 20% and about 50% of the section width.

The Applicant has in particular noticed that in these low-section tyres the percentage difference between the final diameter of the tyre at the end of the shaping step (corresponding to the diameter of the outer sleeve) and the fitting diameter is significantly smaller than the same difference in tyres that are not low-section, which enables a more significant evenness effect to be achieved in the carcass structure.

At the same time, the Applicant has noticed that carrying out building on a single building drum enables substantial elimination of stresses and anomalous deformations that would be otherwise induced to the carcass structure built by processes requiring transfer and subsequent centring of the carcass sleeve from a first-stage drum to the second-stage or shaping drum.

It is thus possible, due to the smaller deformations imposed to the carcass ply/plies during shaping, to greatly improve accuracy and structural homogeneity of the carcass structure, also in the presence of carcass plies or other components made of textile material or other material of moderate structural solidity.

In a further aspect, the present invention relates to an apparatus for building tyres, comprising:

a building drum having at least one outer surface defining an application diameter;

devices for applying at least one carcass ply around said outer surface, according to said application diameter, said at least one carcass ply having axially opposite end flaps;

devices for coaxially engaging around each of the end flaps, an annular anchoring structure defining a smaller fitting diameter than said application diameter, so as to make a carcass sleeve;

devices for positioning an outer sleeve comprising at least one belt structure to a location coaxially centred around the carcass sleeve applied onto said building drum;

shaping devices operating on the building drum to shape the carcass sleeve into a toroidal configuration.

According to another aspect, the present invention relates to locking members for annular anchoring structures of a carcass sleeve of a tyre under processing, comprising at least one annular element consisting of a single piece that is radially deformable between a rest condition and a radially expanded condition.

Preferably said annular element hermetically seals said carcass sleeve at said annular anchoring structures, relative to its building drum.

The present invention, in at least one of the above mentioned aspects, can have one or more of the preferred features described hereinafter.

Preferably said application diameter is greater than or equal to about 102% of the fitting diameter.

According to a further embodiment, said application diameter is smaller than or equal to about 120% of the fitting diameter.

More preferably, said application diameter is greater than or equal to about 105% of the fitting diameter.

Finally, according to a different embodiment, said application diameter is smaller than or equal to about 115% of the fitting diameter.

Said application diameter is preferably included between about 102% and about 120% of the fitting diameter.

Preferably, said application diameter is included between about 105% and about 115% of the fitting diameter.

In this way, advantageously, containment of the deformation imposed to the carcass structure becomes particularly efficient.

In a preferred embodiment, the application diameter is greater than or equal to about 30% of the inner diameter of the outer sleeve.

In a further embodiment, said application diameter is smaller than or equal to about 90% of the inner diameter of the outer sleeve.

In another embodiment the application diameter is greater than or equal to about 50% of the inner diameter of the outer sleeve.

In a different embodiment, the application diameter is smaller than or equal to about 80% of the inner diameter of the outer sleeve.

The application diameter is preferably included between about 30% and about 90% of the inner diameter of the outer sleeve.

Preferably, the application diameter is included between about 50% and about 80% of the inner diameter of the outer sleeve.

In addition or alternatively, the difference between the application diameter and fitting diameter is greater than or equal to about 2% of the difference between the inner diameter of the belt structure and the fitting diameter.

In a different embodiment, the difference between the application diameter and fitting diameter is smaller than or equal to about 70% of the difference between the inner diameter of the belt structure and the fitting diameter.

In another preferred embodiment, the difference between the application diameter and fitting diameter is greater than or equal to about 20% of the difference between the inner diameter of the belt structure and the fitting diameter.

In still another different embodiment, the difference between the application diameter and fitting diameter is smaller than or equal to about 50% of the difference between the inner diameter of the belt structure and the fitting diameter.

The difference between the application diameter and fitting diameter is preferably included between about 2% and about 70% of the difference between the inner diameter of the belt structure and the fitting diameter.

Preferably, the difference between the application diameter and fitting diameter is included between about 20% and about 50% of the difference between the inner diameter of the belt structure and the fitting diameter.

It is to pointed out that application of said at least one carcass ply can be carried out both in the traditional manner through winding of a semifinished product and through application of strip-like elements.

More specifically, according to a preferred embodiment, application of said at least one carcass ply can be carried out, if required, through application of a plurality of strip-like elements disposed in succession along the circumferential extension of the outer surface of the building drum.

In fact, due to the reduced stresses imposed to the carcass ply/plies, the same can be formed through application of strip-like elements disposed circumferentially close to each other on the building drum also in the absence of mutual overlapping, without the expansion of the carcass ply/plies during the shaping step causing undesirable separations between one strip-like element and the other.

In a preferred embodiment, said strip-like elements applied onto the building drum have at least one longitudinal axis parallel to the axis of the building drum.

In a different embodiment, said strip-like elements applied onto the building drum form an angle different from zero between a longitudinal axis thereof and the axis of the building drum.

Possible first components of the tyre can be at least partly applied onto respective rest surfaces extending in axially opposite directions in the continuation of the outer surface of the building drum, before application of the carcass ply or plies.

Before the step of engaging the annular anchoring structures, the rest surfaces, if any, are removed and the side flaps of the carcass ply/plies are preferably folded down towards a geometric axis of the building drum, so as to facilitate positioning of the annular anchoring structures.

The building drum, when shaping has been completed, may be advantageously removed from the shaping station, and the carcass sleeve may be provided to be maintained in an inflated condition so as to facilitate carrying out of possible additional working operations on the carcass sleeve.

The annular anchoring structures are preferably locked relative to the building drum during the shaping step, so as to avoid undesirable and uncontrolled movements of the annular anchoring structures and/or structural distortions of the carcass structure at the beads, following the shaping step.

Concurrently with said locking step a hermetic seal of the carcass sleeve at the annular anchoring structures can be achieved, to facilitate inflation of same for accomplishment of the shaping step.

The building drum can be advantageously transferred from a building station where the components of the carcass sleeve are assembled, to a shaping station where coupling to the outer sleeve is carried out.

The devices for application of said at least one carcass ply can advantageously comprise members for applying a plurality of strip-like elements consecutively in succession along the circumferential extension of the outer surface of the building drum.

Associated with the building drum can be auxiliary support members susceptible of being removably moved close to the building drum on axially opposite sides and having respective rest surfaces extending in the continuation of the outer surface of the building drum to facilitate application of first components of the carcass sleeve and support end flaps of the carcass ply/plies during application on the building drum.

Consequently, the overall outer application surface has an axial size greater than the width of said at least one carcass ply, until said auxiliary support members are moved close to the building drum, on axially opposite sides. Subsequently when said auxiliary support members are removed, the end flaps of the carcass ply disposed on the building drum axially project from the opposite ends of the building drum.

Devices can be provided for folding down, towards a geometric axis of the building drum, the axially opposite end flaps of said at least one carcass ply applied around said building drum.

The shaping devices preferably comprise an actuator operating on the building drum for axial approaching of the annular anchoring structures, and inflating members to supply the carcass sleeve with a working fluid during mutual approaching of the annular anchoring structures.

The inflating members can advantageously comprise a feeding duct.

According to one embodiment said feeding duct is formed in the building drum.

According to another embodiment said inflating members comprise at least one one-way valve to prevent the fluid from flowing back from the carcass sleeve to the feeding duct.

Members for locking the annular anchoring structures relative to the building drum can be also associated with the building drum itself.

Said locking members, susceptible of removable engagement with the building drum, can further comprise closure elements to carry out the hermetic seal of the carcass sleeve at the annular anchoring structures.

The application devices of said at least one carcass ply and the shaping devices can be installed in a building station and a shaping station respectively, and devices for transfer of the building drum from the building station to the shaping station operate therebetween.

Further features and advantages will become more apparent from the detailed description of a preferred, but not exclusive, embodiment of a process and an apparatus for manufacturing tyres, in accordance with the present invention.

BRIEF DESCRIPTION OF THE DRAWINGS

This description will be set out hereinafter with reference to the accompanying drawings, given by way of non limiting example, in which:

FIG. 5 shows a tyre under processing in the step during which the carcass sleeve is shaped for application of an outer sleeve thereto.

DETAILED DESCRIPTION OF THE INVENTION

Figure 1:
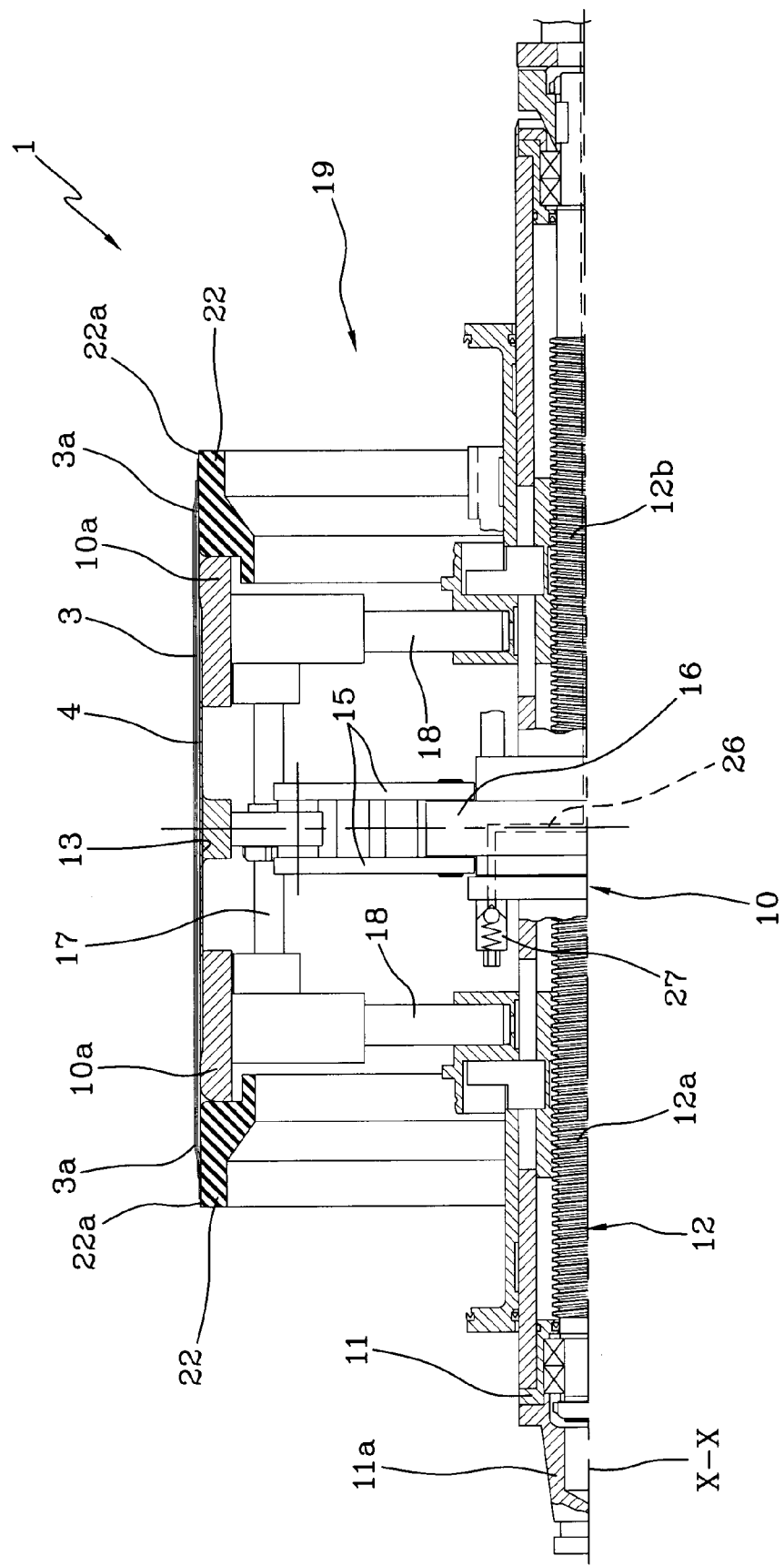
FIG. 1 diagrammatically shows an application step of a carcass ply around a building drum, seen in diametrical section.

With reference to said drawings, an apparatus for manufacturing tyres for vehicle wheels provided for carrying out a method in accordance with the present invention has been generally identified with reference numeral 1.

Apparatus 1 is designed for manufacture of tyres 2 (FIG. 5) essentially comprising at least one carcass ply 3 preferably internally coated with a layer of elastomeric airtight material or a so-called liner 4. Two annular anchoring structures 5, each comprising a so-called bead core 5a carrying an elastomeric filler 5b at a radially external position, are engaged with respective end flaps 3a of the carcass ply or plies 3. Integration of the annular anchoring structures 5 occurs close to regions usually identified as "beads" 6, at which usually engagement between tyre 2 and a respective mounting rim (not shown) takes place, according to a fitting diameter D0 determined by the inner diametrical sizes of the annular anchoring structures 5.

A belt structure 7 is circumferentially applied around the carcass ply/plies 3 and a tread band 8 circumferentially overlaps the belt structure 7. Two sidewalls 9, each extending from the corresponding bead 6 to a respective side edge of the tread band 8, are applied to the carcass ply/pies 3 at laterally opposite positions.

Apparatus 1 comprises a building drum 10 having two halves 10a supported by a central shaft 11 extending along a geometric axis X-X of the building drum 10 itself. Halves 10a can be moved axially close to each other, upon command of a screw threaded bar for example, that is operatively disposed within the central shaft 11 and carries two threaded portions 12a, 12b, a right-hand one and a left-hand one respectively, each of them engaging one of halves 10a. Halves 10a of the building drum 10 are consequently induced to simultaneously translate in respectively opposite directions along the central shaft 11, following rotations imparted to the screw threaded bar 12 by means of an actuator (not shown) that can be operatively coupled to one end of the central shaft 11.

The building drum 10 can further comprise a central section 13 slidably engaging halves 10a and extending in surface-continuity relationship with the latter so as to define a substantially continuous outer surface 14 with them.

In accordance with a possible alternative embodiment not shown, halves 10a of the building drum 10 can axially extend towards each other having mutually-meshing respective toothings, i.e. in which the teeth of each toothing are slidably inserted in an alternated sequence between the teeth belonging to the other half. The halves 10a and central section 13 are each made up of respective circumferential sectors, radially movable between a rest condition (not shown) at which they are disposed radially close to the geometric axis X-X to give the building drum 10 a diametrical bulkiness smaller than the fitting diameter D0 of the tyre under processing, so as to enable removal of the built tyre 2 from the building drum itself, and a work condition at which, as shown in the accompanying figures, said sectors extend in circumferential-continuity relationship so as to form said outer surface 14 defining an application diameter D1 that is significantly greater than the fitting diameter D0.

In the example shown, radial movement of the circumferential sectors is carried out through a plurality of connecting rods 15, each of them being linked between one of the sectors of the central section 13 of the building drum 10, and a drive collar 16 rotatably carried by the central shaft 11 and drivable in angular rotation by means of an outer actuator (not shown). By means of transmission bars 17 axially extending through the sectors of the central section 13, the radial movements of the latter are transmitted to the circumferential sectors of the axially opposite halves 10a of the building drum 10, slidably guided along respective columns 18 radially extending relative to the central shaft 11.

The building drum 10 lends itself to be transferred by at least one robotized arm (not shown) or transfer devices of other type operating on at least one grip end 11a provided by the central shaft 11, to one or more work stations 19, 20 to enable carrying out of different working steps aiming at assembling the tyre 2 being processed.

Figure 2:
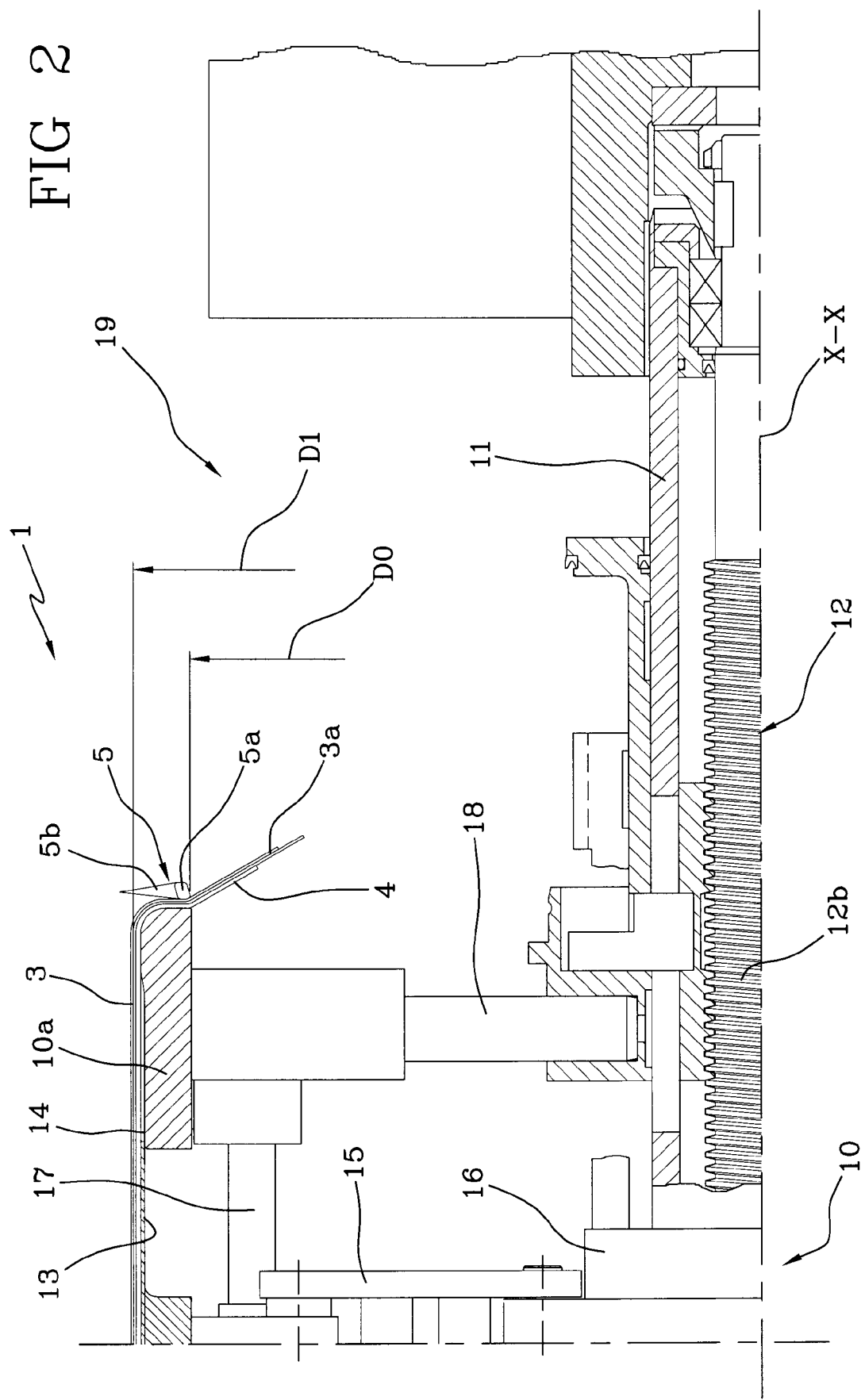
FIG. 2 shows, to an enlarged scale relative to FIG. 1, a step in which annular anchoring structures are coaxially fitted on the respective end flaps of the carcass ply.
Figure 3:
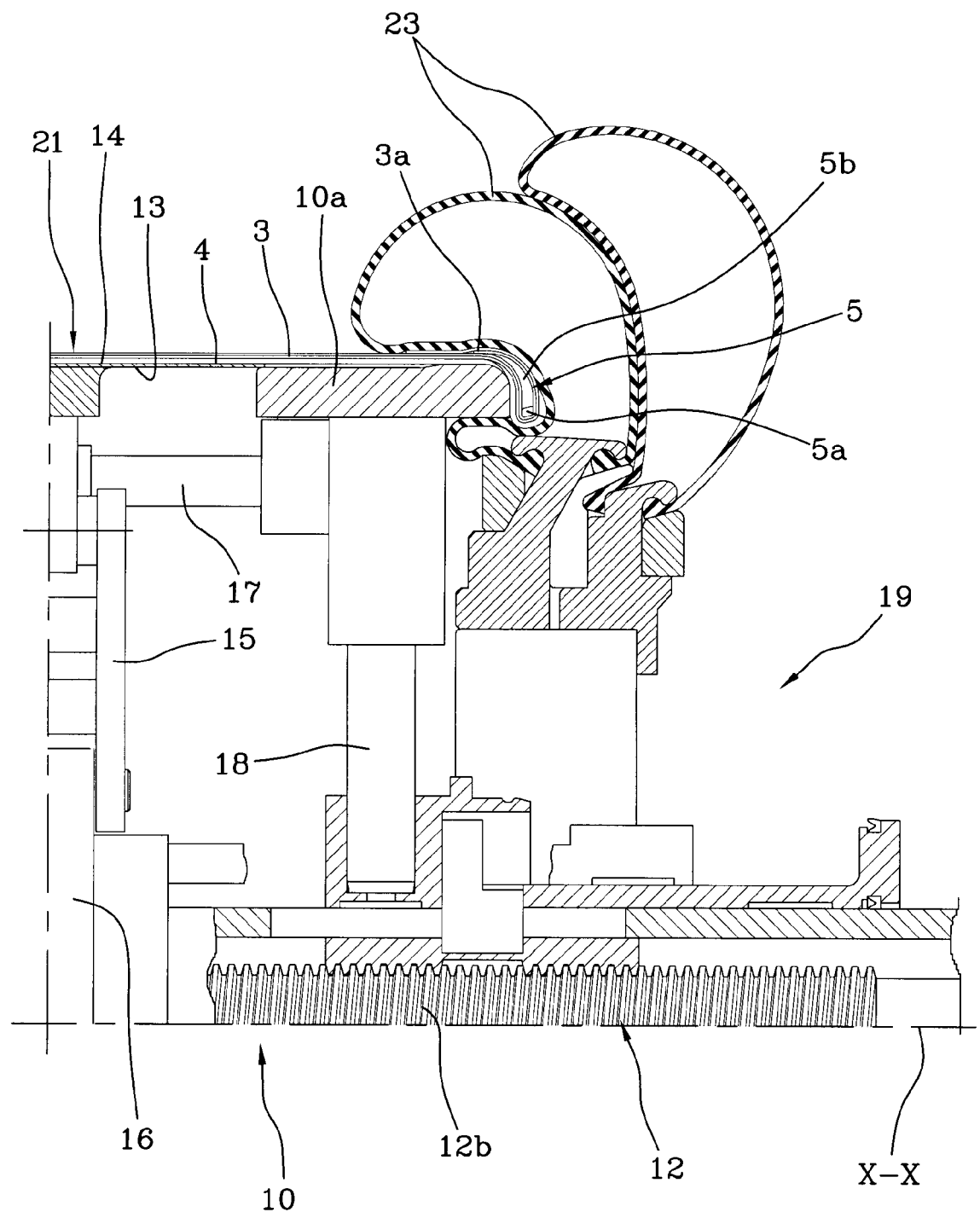
FIG. 3 shows, to an enlarged scale relative to FIG. 1, a step of turning up the end flaps of the carcass ply around the respective annular anchoring structures.

In more detail, the building drum 10 is first engaged in a building station 19 (FIGS. 1 to 3) in which a so-called carcass sleeve 21 comprising the carcass ply/plies 3 coupled to the respective annular anchoring structures 5 is made.

The building station 19 is preferably equipped with auxiliary support members 22, made in the form of two annular elements for example, that are adapted to removably approach the building drum 10 on axially opposite sides. The auxiliary support members 22 have respective rest surfaces 22a preferably having a substantially cylindrical conformation, the diameter of which is substantially the same as the application diameter D1. When approaching has occurred, the rest surfaces 22a extend without interruption in the continuation of the outer surface 14.

In the building station 19 auxiliary devices (not shown) can operate for application of first components of the carcass sleeve 21 at the building drum 10. In more detail, these auxiliary devices can comprise one or more dispensing members for example, which supply at least one continuous elongated element of elastomeric material while the building drum 10 is being driven in rotation around its geometric axis X-X, so as to form the above mentioned liner 4 on the outer surface 14 and the rest surfaces 22a. In addition or as an alternative to liner 4, the auxiliary devices can be designed to form abrasion-preventing inserts on the rest surfaces 22a, which inserts are to be incorporated in the region of beads 6 and/or, in case of the so-called run-flat tyres, auxiliary support inserts made of elastomeric material (the so-called sidewall inserts) applied to the respective halves 10a of the building drum 10, so that they are then incorporated into tyre 2 in the sidewall 9 region.

Subsequently to formation of said first components, devices not shown as made in any convenient manner apply the carcass ply/plies 3 around the outer surface 14, according to said application diameter D1. Each carcass ply 3 can consist of a manufactured article in the form of a continuous strip previously cut according to the circumferential extension of the outer surface 14 and delivered towards said outer surface, while the building drum 10 is rotating around its geometric axis X-X, so as to cause winding of said strip around the outer surface 14.

In a preferential embodiment, the application devices comprise members for sequentially applying a plurality of strip-like elements disposed transversely of the circumferential extension of the outer surface 14, while the building drum 10 is being driven in rotation following a step-by-step operation, in the same manner as described in U.S. Pat. No. 6,328,084 in the name of the same Applicant, for example. It is to be pointed out that, to the aims of the present description, by the term "strip-like element" it is intended an elementary component having an elongated conformation and comprising one or more reinforcing cords associated with an elastomeric matrix, the length of which subtends the width of the carcass ply/plies 3 and which has a width corresponding to a fraction of the circumferential extension of the carcass ply/plies 3 themselves.

Thus the carcass ply/plies 3 are directly formed on the building drum 10, by means of the strip-like elements applied in mutually approached relationship to cover the whole circumferential extension of the outer surface 14.

Preferably, the outer surface 14 has a smaller axial dimension than the width of said at least one carcass ply 3, so that the end flaps 3a of the carcass ply/plies 3 disposed on the building drum 10 axially project from the opposite ends of the outer surface 14 and are at least partly supported by said rest surfaces 22a.

When formation of the carcass ply/plies 3 has been completed, the auxiliary support members 22 are axially moved apart from the respective halves 10a of the building drum 10, so as to remove the rest surfaces 22a from liner 4 and from the carcass ply/plies 3, by slipping off. Removal of the rest surfaces 22a makes it possible to fold down the end flaps 3a of the carcass ply/plies 3 applied around the building drum 10, towards the geometric axis X-X of the building drum 10 itself, with the aid of rollers or other devices not shown for example, that can be made in any convenient manner.

Location members not shown as they can be made in known manner, carry out fitting of each of the annular anchoring structures 5 coaxially around one of the end flaps 3a of the carcass ply/plies 3 folded down towards the geometric axis X-X. The inner diameter of the annular anchoring structures 5 defining said fitting diameter D0, is smaller than the diameter of the outer surface 14 defining the application diameter D1 of the carcass ply/plies 3. Consequently, the annular anchoring structures 5 fitted on the end flaps 3a lend themselves to be located in axial abutment relationship, each against the corresponding half of the building drum 10.

When location is over, inflatable bags 23 or other turning-up members carry out turning up of each of the end flaps 3a around the respective annular anchoring structure, so as to stabilise engagement of the latter with the carcass ply 3 causing formation of said carcass sleeve 21.

When engagement of the annular anchoring structures 5 has been completed, application of the sidewalls 9 can take place.

Figure 4:
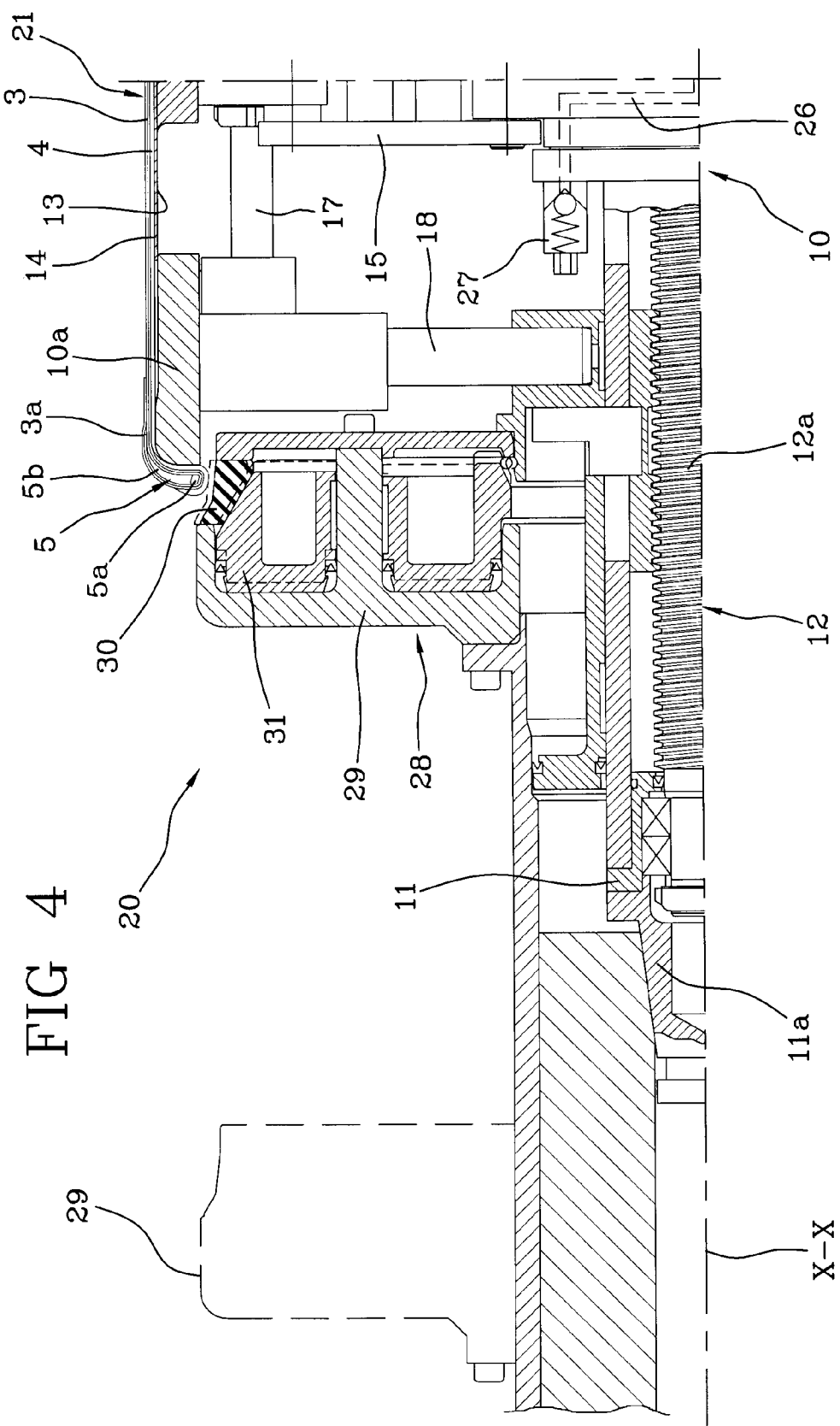
FIG. 4 diagrammatically shows a carcass sleeve in diametrical section during a step of engagement of the beads by locking members.

The building drum 10 carrying the carcass sleeve 21 is then transferred from the building station 19 to a shaping station 20 (FIGS. 4 and 5) to receive an outer sleeve 24 in engagement, which integrates the belt structure 7 preferably already coupled to the tread band B.

The outer sleeve 24 can be previously prepared by formation or winding of one or more belt layers adapted to form the belt structure 7, on an auxiliary drum (not shown), and subsequent winding of the tread band 8 on the belt structure 7 carried by the auxiliary drum. More specifically, building of the tread band 8 can be carried out by dispensing members delivering an elastomeric continuous elongated element that is applied in the form of coils disposed in side by side relationship and radially superposed on the belt structure 7 carried by the auxiliary drum, while the latter is being driven in rotation.

The outer sleeve 24 thus formed is adapted to be removed from the auxiliary drum, by a transfer ring 25 for example or other suitable devices that will then transfer it to the shaping station 20 where it is disposed in a coaxially centred position around the carcass sleeve 21 carried by the building drum 10.

Shaping devices acting on the building drum 10 operate in the shaping station 20 to shape the carcass sleeve 21 into a toroidal configuration (FIG. 5), so as to cause application of same against a radially internal surface of the outer sleeve 24.

The shaping devices can for example comprise said actuator (not shown) designed to drive the screw threaded bar 12 in rotation to cause mutual axial approaching of halves 10a of the drum and, as a result, of the annular anchoring structures 5 of the carcass sleeve 21. The shaping devices further comprise inflating members having a pneumatic circuit connected at least with a feeding duct 26 formed along the central shaft 11 for example, to feed the carcass sleeve 21 with a working fluid and cause radial expansion of same through inflation, during mutual approaching of the annular anchoring structures 5.

In one embodiment, at least one one-way valve 27 is associated with the feeding duct 26 to prevent the fluid from flowing back from the carcass sleeve 21 to the feeding duct 26, so as to keep the carcass sleeve 21 in an inflated condition even when the feeding duct 26 is disconnected from the pneumatic circuit.

To reduce the risk that undesirable deformations be transmitted to the regions of beads 6 during radial expansion of the carcass sleeve 21, locking members 28 can also operate in the shaping station 20 to lock the annular anchoring structures 5 relative to the building drum 10.

The locking members 28 can for example comprise a pair of flanges 29 to be removably fastened to the shaping drum 10 in axially approached relationship and on respectively opposite sides. Each flange 29 carries one annular element 30 that can be elastically deformed between a rest condition and a radially expanded condition.

According to a preferred embodiment, each annular element 30 is of made of one piece alone to minimise the geometric distortion effects due to passage between the rest condition and the radially expanded condition.

Within each annular element 30, a thrust ring 31 is drivable to cause elastic deformation of the annular element itself between the rest condition and the radially expanded condition, said ring being operated by a working fluid for example.

Before carrying out the shaping step, flanges 29 are axially positioned relative to the annular anchoring structures 5, with the respective annular elements 30 in a rest condition that are at least partly radially fitted inside the annular anchoring structures themselves.

The thrust rings 31 are then fluid operated to bring the annular elements 30 to a radially expanded condition. Under this circumstance, the annular elements 30 operate in radial-thrust relationship from the inside to the outside against the radially internal surfaces of the annular anchoring structures 5 causing an efficient locking of same in terms of stresses transmitted during the subsequent shaping step.

Preferably, each annular element 30 has a continuous circumferential extension, so that it performs the function of a hermetically-sealed closure element of the carcass sleeve 21 at the annular anchoring structures 5, facilitating radial expansion of the sleeve itself and maintenance of the inflated condition, following the shaping step.

As previously mentioned, application of the carcass ply/plies 3 onto the building drum 10 according to an application diameter D1 greater than the fitting diameter D0 defined by the annular anchoring structures 5, advantageously enables a significant reduction in the deformations suffered by the carcass ply/plies themselves for reaching a position against the inner surface of the outer sleeve 24, through radial expansion during the shaping step.

These reduced deformations result in less stresses transmitted to the bead 6 regions, which is advantageous for the geometric and structural accuracy of same, as well as in a more reduced thinning of the cords of the carcass ply/plies 3, in particular close to the crown regions in contact with the belt structure 7. Since thinning of the cords in the carcass ply/plies 3 following radial expansion can be less uniform along the circumferential extension of tyre 2, to a lower expansion also advantageously corresponds a greater homogeneity in the circumferential distribution of the carcass cords in the crown regions.

In exploiting the advantages of the present invention at the best, a person skilled in the art will be able to experiment, within the preferred values, the expressed ones relative to the application diameter D1, paying attention to the fact that they must be intended as average values measurable between the radially innermost surface and the radially outermost surface of the whole carcass plies.

The Applicant has found preferable for the application diameter D1 of the carcass ply/plies 3 to be included between about 102% and about 120% of the fitting diameter D0.

More preferably, said application diameter D1 can be included between about 105% and about 115% of the fitting diameter D0.

In a preferred embodiment of the process in accordance with the invention, the application diameter D1 is included between about 30% and about 90% of the inner diameter D2 of the outer sleeve 24 (which is coincident with the inner diameter of the belt structure).

Still more preferably said application diameter D1 is included between about 50% and about 80% of the inner diameter D2 of the outer sleeve 24.

It is also preferable for the difference between the application diameter D1 and the fitting diameter D0 to be included between about 2% and about 70% of the difference between the inner diameter D2 of the outer sleeve 24 and the fitting diameter D0.

More preferably the difference between the application diameter D1 and the fitting diameter D0 can be included between about 20% and about 50% of the difference between the inner diameter D2 of the outer sleeve 24 and the fitting diameter D0.

To the aims of the present invention, the process and apparatus in accordance with the invention is to be preferably used for manufacturing high and ultra high performance low-section tyres.

In fact, since in these low-section tyres the difference between the final diameter of the carcass sleeve 21 at the end of the shaping step (corresponding to the diameter of the outer sleeve 24) and the fitting diameter D0 is relatively reduced, the reduction in the difference between the final shaping diameter (corresponding to D2) and the application diameter of the carcass ply/plies 3 (corresponding to D1) enables a more significant uniformity effect in the carcass structure to be achieved.

When the shaping step is over, the building drum 10 can be removed from the shaping station 20 to be possibly transferred to at least one additional work station (not shown), designed for manufacture of the sidewalls 9 for example.

Advantageously, the presence of the one-way valve 27 and of flanges 29 with the annular elements 30 in a radially expanded condition against the annular anchoring structures 5 maintains the carcass sleeve 21 to an inflated condition, so as to facilitate application of the sidewalls 9 and/or other working operations to be carried out in the additional work stations 19, 20.

When building has been completed, tyre 2 can be removed from the building drum 10, upon radial contraction of the latter, for being submitted to a vulcanisation step to be carried out in any convenient manner.

The invention claimed is:

1. A process for manufacturing tyres, the process comprising the steps of:
    applying at least one carcass ply according to an application diameter around at least one outer surface of a building drum, said at least one carcass ply having axially opposite end flaps;
    coaxially engaging around each of the end flaps, an annular anchoring structure defining a fitting diameter smaller than said application diameter so as to make a carcass sleeve;
    positioning an outer sleeve comprising at least one belt structure at a coaxially centered position around said carcass sleeve applied onto said building drum;
    shaping said carcass sleeve from the application diameter into a toroidal configuration to apply said carcass sleeve against a radially internal surface of said outer sleeve; and
    after coaxially engaging said annular anchoring structures and before shaping said carcass sleeve, axially approaching locking members towards said annular anchoring structures, removably fastening said locking members to the building drum, and then moving a circumferentially continuous annular thrust ring carried by each of said locking members in an axial direction into direct contact with an elastically deformable annular element carried by each of said locking members to deform the annular element from a rest condition to a radially expanded condition against each of the annular anchoring structures,
    wherein the locking members do not engage the annular anchoring structures when coaxially engaging the annular anchoring structures around the end flaps,
    wherein the annular anchoring structures are locked relative to the building drum during the shaping step by said locking members,
    wherein said locking members are disengaged from the building drum after shaping said carcass sleeve, and
    wherein the at least one outer surface of the building drum has a same diameter when the at least one carcass ply is applied, when the annular anchoring structures are coaxially engaged around the end flaps, and when the locking members are engaged to the building drum.

2. The process as claimed in claim 1, wherein application of said at least one carcass ply comprises a step of applying a plurality of strip-like elements disposed in succession along a circumferential extension of the outer surface of the building drum.

3. A process as claimed in claim 1, wherein application of said at least one carcass ply comprises a step of circumferentially winding a manufactured article in the form of a continuous strip around the outer surface of the building drum.

4. The process as claimed in claim 1, wherein said application diameter is greater than or equal to about 102% of the fitting diameter.

5. The process as claimed in claim 4, wherein application of said at least one carcass ply comprises a step of applying a plurality of strip-like elements disposed in succession along a circumferential extension of the outer surface of the building drum, and wherein said strip-like elements applied onto said building drum have at least one longitudinal axis parallel to an axis of the building drum.

6. The process as claimed in claim 4, wherein application of said at least one carcass ply comprises a step of applying a plurality of strip-like elements disposed in succession along a circumferential extension of the outer surface of the building drum, and wherein said strip-like elements applied onto said building drum form an angle different from zero between a longitudinal axis thereof and an axis of the building drum.

7. A process as claimed in claim 1, wherein said application diameter is smaller than or equal to about 120% of the fitting diameter.

8. A process as claimed in claim 1, wherein said application diameter is greater than or equal to about 105% of the fitting diameter.

9. The process as claimed in claim 1, wherein said application diameter is smaller than or equal to about 115% of the fitting diameter.

10. The process as claimed in claim 1, wherein the application diameter is greater than or equal to about 30% of an inner diameter of the outer sleeve.

11. The process as claimed in claim 1, wherein the application diameter is smaller than or equal to about 90% of an inner diameter of the outer sleeve.

12. The process as claimed in claim 1, wherein the application diameter is greater than or equal to about 50% of an inner diameter of the outer sleeve.

13. The process as claimed in claim 1, wherein the application diameter is smaller than or equal to about 80% of an inner diameter of the outer sleeve.

14. The process as claimed in claim 1, wherein a difference between the application diameter and the fitting diameter is greater than or equal to about 2% of a difference between an inner diameter of the outer sleeve and the fitting diameter.

15. The process as claimed in claim 1, wherein a difference between the application diameter and the fitting diameter is smaller than or equal to about 70% of a difference between an inner diameter of the outer sleeve and the fitting diameter.

16. The process as claimed in claim 1, wherein a difference between the application diameter and the fitting diameter is smaller than or equal to about 50% of a difference between an inner diameter of the outer sleeve and the fitting diameter.

17. The process as claimed in claim 1, wherein during application of said at least one carcass ply onto the building drum, the end flaps of said at least one carcass ply axially project from opposite ends of the outer surface of the building drum.

18. The process as claimed in claim 1, wherein during application of said at least one carcass ply onto the building drum, the end flaps of said at least one carcass ply are supported on respective rest surfaces extending in a continuation of the outer surface of the building drum.

19. The process as claimed in claim 1, wherein before the step of applying said at least one carcass ply onto the building drum, application of at least one first component of the carcass sleeve is carried out at the building drum.

20. The process as claimed in claim 19, wherein said at least one first component is at least partly applied onto respective rest surfaces extending in axially opposite directions in the continuation of the outer surface of the building drum.

21. The process as claimed in claim 1, further comprising the step of folding down toward a geometric axis of the building drum, the axially-opposite end flaps of the at least one carcass ply applied around the building drum.

22. The process as claimed in claim 21, wherein:
during application of said at least one carcass ply onto the building drum, the end flaps of said at least one carcass ply are supported on respective rest surfaces extending in a continuation of the outer surface of the building drum; and
the process further comprises the step of removing the rest surfaces before folding down the end flaps of said at least one carcass ply.

23. The process as claimed in claim 1, wherein the step of engaging each annular anchoring structure comprises:
coaxially fitting the annular anchoring structure around a respective end flap of said at least one carcass ply; and
turning up the end flap of said at least one carcass ply around the respective annular anchoring structure.

24. The process as claimed in claim 1, wherein the shaping step comprises:
axially approaching the annular anchoring structures; and
radially expanding the carcass sleeve during mutual approaching of the annular anchoring structures.

25. The process as claimed in claim 24, wherein radial expansion of the carcass sleeve is carried out through inflation.

26. The process as claimed in claim 25, further comprising the steps of:
removing the building drum from a shaping station; and
maintaining an inflated condition in the carcass sleeve after removal of the building drum from the shaping station.

27. The process as claimed in claim 26, wherein additional working operations are carried out on the carcass sleeve in the inflated condition after removal of the building drum from the shaping station.

28. The process as claimed in claim 27, wherein concurrently with said locking step, the carcass sleeve is hermetically sealed at the annular anchoring structures.

29. The process as claimed in claim 1, further comprising a step of transferring the building drum.

30. The process as claimed in claim 1, wherein the building drum is transferred from a building station to a shaping station before the step of positioning the outer sleeve.

31. The process as claimed in claim 1, wherein said outer sleeve comprises a tread band wound in a radially external position to said belt structure.

32. The process as claimed in claim 31, wherein said tread band is built on an auxiliary drum carrying said belt structure, through winding of at least one elastomeric continuous elongated element into coils disposed in side by side relationship and radially superposed.

33. The process as claimed in claim 1, further comprising the steps of:
removing a built tyre from the building drum; and
vulcanising said built tyre.

34. The process as claimed in claim 33, wherein removal of the built tyre is carried out through at least one radial contraction of the building drum.

35. The process as claimed in claim 1, wherein a built tyre has a section height, measured between a radially outermost point of a tread band and a radially innermost point of a bead between about 20% and about 50% of a section width axially measured at a point of maximum chord of the built tyre.

36. The process as claimed in claim 1, wherein a difference between the application diameter and the fitting diameter is greater than or equal to about 20% of a difference between an inner diameter of the outer sleeve and the fitting diameter.

37. A process for manufacturing tyres, the process comprising the steps of:
applying at least one carcass ply according to an application diameter around at least one outer surface of a building drum, said at least one carcass ply having axially opposite end flaps;
coaxially engaging around each of the end flaps, an annular anchoring structure defining a fitting diameter smaller than said application diameter so as to make a carcass sleeve;
transferring the building drum carrying the carcass sleeve from a building station to a shaping station;
at the shaping station, positioning an outer sleeve comprising at least one belt structure at a coaxially centered position around said carcass sleeve applied onto said building drum;
at the shaping station, shaping said carcass sleeve from the application diameter into a toroidal configuration to apply said carcass sleeve against a radially internal surface of said outer sleeve; and
at the shaping station, after coaxially engaging said annular anchoring structures and before shaping said carcass sleeve, axially approaching locking members towards said annular anchoring structures, removably fastening said locking members to the building drum, and then moving a circumferentially continuous annular thrust ring carried by each of said locking members in an axial direction into direct contact with an elastically deformable annular element carried by each of said locking members to deform the annular element from a rest condition to a radially expanded condition against each of the annular anchoring structures,
wherein the locking members do not engage the annular anchoring structures when coaxially engaging the annular anchoring structures around the end flaps,
wherein the annular anchoring structures are locked relative to the building drum during the shaping step by said locking members,
wherein said locking members are disengaged from the building drum after shaping said carcass sleeve, and
wherein the at least one outer surface of the building drum has a same diameter when the at least one carcass ply is applied, when the annular anchoring structures are coaxially engaged around the end flaps, and when the locking members are engaged to the building drum.

38. The process as claimed in claim 37, wherein application of said at least one carcass ply comprises a step of applying a plurality of strip-like elements disposed in succession along a circumferential extension of the outer surface of the building drum.

39. A process as claimed in claim 37, wherein application of said at least one carcass ply comprises a step of circumferentially winding a manufactured article in the form of a continuous strip around the outer surface of the building drum.

40. The process as claimed in claim 37, wherein said application diameter is greater than or equal to about 102% of the fitting diameter.

41. The process as claimed in claim 40, wherein application of said at least one carcass ply comprises a step of applying a plurality of strip-like elements disposed in succession along a circumferential extension of the outer surface of the building drum, and wherein said strip-like elements applied onto said building drum have at least one longitudinal axis parallel to an axis of the building drum.

42. The process as claimed in claim 40, wherein application of said at least one carcass ply comprises a step of applying a plurality of strip-like elements disposed in succession along a circumferential extension of the outer surface of the building drum, and wherein said strip-like elements applied onto said building drum form an angle different from zero between a longitudinal axis thereof and an axis of the building drum.

43. A process as claimed in claim 37, wherein said application diameter is smaller than or equal to about 120% of the fitting diameter.

44. A process as claimed in claim 37, wherein said application diameter is greater than or equal to about 105% of the fitting diameter.

45. The process as claimed in claim 37, wherein said application diameter is smaller than or equal to about 115% of the fitting diameter.

46. The process as claimed in claim 37, wherein the application diameter is greater than or equal to about 30% of an inner diameter of the outer sleeve.

47. The process as claimed in claim 37, wherein the application diameter is smaller than or equal to about 90% of an inner diameter of the outer sleeve.

48. The process as claimed in claim 37, wherein the application diameter is greater than or equal to about 50% of an inner diameter of the outer sleeve.

49. The process as claimed in claim 37, wherein the application diameter is smaller than or equal to about 80% of an inner diameter of the outer sleeve.

50. The process as claimed in claim 37, wherein a difference between the application diameter and the fitting diameter is greater than or equal to about 2% of a difference between an inner diameter of the outer sleeve and the fitting diameter.

51. The process as claimed in claim 37, wherein a difference between the application diameter and the fitting diameter is smaller than or equal to about 70% of a difference between an inner diameter of the outer sleeve and the fitting diameter.

52. The process as claimed in claim 37, wherein a difference between the application diameter and the fitting diameter is smaller than or equal to about 50% of a difference between an inner diameter of the outer sleeve and the fitting diameter.

53. The process as claimed in claim 37, wherein during application of said at least one carcass ply onto the building drum, the end flaps of said at least one carcass ply axially project from opposite ends of the outer surface of the building drum.

54. The process as claimed in claim 37, wherein during application of said at least one carcass ply onto the building drum, the end flaps of said at least one carcass ply are supported on respective rest surfaces extending in a continuation of the outer surface of the building drum.

55. The process as claimed in claim 37, wherein before the step of applying said at least one carcass ply onto the building drum, application of at least one first component of the carcass sleeve is carried out at the building drum.

56. The process as claimed in claim 55, wherein said at least one first component is at least partly applied onto respective rest surfaces extending in axially opposite directions in the continuation of the outer surface of the building drum.

57. The process as claimed in claim 37, further comprising the step of folding down toward a geometric axis of the building drum, the axially-opposite end flaps of the at least one carcass ply applied around the building drum.

58. The process as claimed in claim 57, wherein:
during application of said at least one carcass ply onto the building drum, the end flaps of said at least one carcass ply are supported on respective rest surfaces extending in a continuation of the outer surface of the building drum; and
the process further comprises the step of removing the rest surfaces before folding down the end flaps of said at least one carcass ply.

59. The process as claimed in claim 37, wherein the step of engaging each annular anchoring structure comprises:
coaxially fitting the annular anchoring structure around a respective end flap of said at least one carcass ply; and
turning up the end flap of said at least one carcass ply around the respective annular anchoring structure.

60. The process as claimed in claim 37, wherein the shaping step comprises:
axially approaching the annular anchoring structures; and
radially expanding the carcass sleeve during mutual approaching of the annular anchoring structures.

61. The process as claimed in claim 60, wherein radial expansion of the carcass sleeve is carried out through inflation.

62. The process as claimed in claim 61, further comprising the steps of:
removing the building drum from the shaping station; and
maintaining an inflated condition in the carcass sleeve after removal of the building drum from the shaping station.

63. The process as claimed in claim 62, wherein additional working operations are carried out on the carcass sleeve in the inflated condition after removal of the building drum from the shaping station.

64. The process as claimed in claim 63, wherein concurrently with said locking step, the carcass sleeve is hermetically sealed at the annular anchoring structures.

65. The process as claimed in claim 37, wherein said outer sleeve comprises a tread band wound in a radially external position to said belt structure.

66. The process as claimed in claim 65, wherein said tread band is built on an auxiliary drum carrying said belt structure, through winding of at least one elastomeric continuous elongated element into coils disposed in side by side relationship and radially superposed.

67. The process as claimed in claim 37, further comprising the steps of:
removing a built tyre from the building drum; and
vulcanising said built tyre.

68. The process as claimed in claim 67, wherein removal of the built tyre is carried out through at least one radial contraction of the building drum.

69. The process as claimed in claim 37, wherein a built tyre has a section height, measured between a radially outermost point of a tread band and a radially innermost point of a bead between about 20% and about 50% of a section width axially measured at a point of maximum chord of the built tyre.

70. The process as claimed in claim 37, wherein a difference between the application diameter and the fitting diameter is greater than or equal to about 20% of a difference between an inner diameter of the outer sleeve and the fitting diameter.

71. A process for manufacturing tyres, the process comprising the steps of:
applying at least one carcass ply according to an application diameter around at least one outer surface of a building drum, said at least one carcass ply having axially opposite end flaps;
coaxially engaging around each of the end flaps, an annular anchoring structure defining a fitting diameter smaller than said application diameter so as to make a carcass sleeve;
positioning an outer sleeve comprising at least one belt structure at a coaxially centered position around said carcass sleeve applied onto said building drum;
shaping said carcass sleeve from the application diameter into a toroidal configuration to apply said carcass sleeve against a radially internal surface of said outer sleeve; and
after coaxially engaging said annular anchoring structures and before shaping said carcass sleeve, axially approaching locking members towards said annular anchoring structures, then removably fastening said locking members to the building drum and moving a circumferentially continuous annular thrust ring carried by each of said locking members in an axial direction into direct contact with an elastically deformable annular element carried by each of said locking members to deform the annular element from a rest condition to a radially expanded condition against each of the annular anchoring structures,
wherein the annular anchoring structures are locked relative to the building drum during the shaping step by said locking members,
wherein said locking members are disengaged from the building drum after shaping said carcass sleeve, and
wherein the at least one outer surface of the building drum has a same diameter when the at least one carcass ply is applied, when the annular anchoring structures are coaxially engaged around the end flaps, and when the locking members are engaged to the building drum.

72. The process as claimed in claim 71, wherein application of said at least one carcass ply comprises a step of applying a plurality of strip-like elements disposed in succession along a circumferential extension of the outer surface of the building drum.

73. A process as claimed in claim 71, wherein application of said at least one carcass ply comprises a step of circumferentially winding a manufactured article in the form of a continuous strip around the outer surface of the building drum.

74. The process as claimed in claim 71, wherein said application diameter is greater than or equal to about 102% of the fitting diameter.

75. The process as claimed in claim 74, wherein application of said at least one carcass ply comprises a step of applying a plurality of strip-like elements disposed in succession along a circumferential extension of the outer surface of the building drum, and wherein said strip-like elements applied onto said building drum have at least one longitudinal axis parallel to an axis of the building drum.

76. The process as claimed in claim 74, wherein application of said at least one carcass ply comprises a step of applying a plurality of strip-like elements disposed in succession along a circumferential extension of the outer surface of the building drum, and wherein said strip-like elements applied onto said building drum form an angle different from zero between a longitudinal axis thereof and an axis of the building drum.

77. A process as claimed in claim 71, wherein said application diameter is smaller than or equal to about 120% of the fitting diameter.

78. A process as claimed in claim 71, wherein said application diameter is greater than or equal to about 105% of the fitting diameter.

79. The process as claimed in claim 71, wherein said application diameter is smaller than or equal to about 115% of the fitting diameter.

80. The process as claimed in claim 71, wherein the application diameter is greater than or equal to about 30% of an inner diameter of the outer sleeve.

81. The process as claimed in claim 71, wherein the application diameter is smaller than or equal to about 90% of an inner diameter of the outer sleeve.

82. The process as claimed in claim 71, wherein the application diameter is greater than or equal to about 50% of an inner diameter of the outer sleeve.

83. The process as claimed in claim 71, wherein the application diameter is smaller than or equal to about 80% of an inner diameter of the outer sleeve.

84. The process as claimed in claim 71, wherein a difference between the application diameter and the fitting diameter is greater than or equal to about 2% of a difference between an inner diameter of the outer sleeve and the fitting diameter.

85. The process as claimed in claim 71, wherein a difference between the application diameter and the fitting diameter is smaller than or equal to about 70% of a difference between an inner diameter of the outer sleeve and the fitting diameter.

86. The process as claimed in claim 71, wherein a difference between the application diameter and the fitting diameter is smaller than or equal to about 50% of a difference between an inner diameter of the outer sleeve and the fitting diameter.

87. The process as claimed in claim 71, wherein during application of said at least one carcass ply onto the building drum, the end flaps of said at least one carcass ply axially project from opposite ends of the outer surface of the building drum.

88. The process as claimed in claim 71, wherein during application of said at least one carcass ply onto the building drum, the end flaps of said at least one carcass ply are supported on respective rest surfaces extending in a continuation of the outer surface of the building drum.

89. The process as claimed in claim 71, wherein before the step of applying said at least one carcass ply onto the building drum, application of at least one first component of the carcass sleeve is carried out at the building drum.

90. The process as claimed in claim 89, wherein said at least one first component is at least partly applied onto respective rest surfaces extending in axially opposite directions in the continuation of the outer surface of the building drum.

91. The process as claimed in claim 71, further comprising the step of folding down toward a geometric axis of the building drum, the axially-opposite end flaps of the at least one carcass ply applied around the building drum.

92. The process as claimed in claim 91, wherein:
during application of said at least one carcass ply onto the building drum, the end flaps of said at least one carcass ply are supported on respective rest surfaces extending in a continuation of the outer surface of the building drum; and
the process further comprises the step of removing the rest surfaces before folding down the end flaps of said at least one carcass ply.

93. The process as claimed in claim 71, wherein the step of engaging each annular anchoring structure comprises:
coaxially fitting the annular anchoring structure around a respective end flap of said at least one carcass ply; and
turning up the end flap of said at least one carcass ply around the respective annular anchoring structure.

94. The process as claimed in claim 71, wherein the shaping step comprises:
axially approaching the annular anchoring structures; and
radially expanding the carcass sleeve during mutual approaching of the annular anchoring structures.

95. The process as claimed in claim 94, wherein radial expansion of the carcass sleeve is carried out through inflation.

96. The process as claimed in claim 95, further comprising the steps of:
removing the building drum from a shaping station; and
maintaining an inflated condition in the carcass sleeve after removal of the building drum from the shaping station.

97. The process as claimed in claim 96, wherein additional working operations are carried out on the carcass sleeve in the inflated condition after removal of the building drum from the shaping station.

98. The process as claimed in claim 97, wherein concurrently with said locking step, the carcass sleeve is hermetically sealed at the annular anchoring structures.

99. The process as claimed in claim 71, further comprising a step of transferring the building drum.

100. The process as claimed in claim 71, wherein the building drum is transferred from a building station to a shaping station before the step of positioning the outer sleeve.

101. The process as claimed in claim 71, wherein said outer sleeve comprises a tread band wound in a radially external position to said belt structure.

102. The process as claimed in claim 101, wherein said tread band is built on an auxiliary drum carrying said belt structure, through winding of at least one elastomeric continuous elongated element into coils disposed in side by side relationship and radially superposed.

103. The process as claimed in claim 71, further comprising the steps of:
removing a built tyre from the building drum; and
vulcanising said built tyre.

104. The process as claimed in claim 103, wherein removal of the built tyre is carried out through at least one radial contraction of the building drum.

105. The process as claimed in claim 71, wherein a built tyre has a section height, measured between a radially outermost point of a tread band and a radially innermost point of a bead between about 20% and about 50% of a section width axially measured at a point of maximum chord of the built tyre.

106. The process as claimed in claim 71, wherein a difference between the application diameter and the fitting diameter is greater than or equal to about 20% of a difference between an inner diameter of the outer sleeve and the fitting diameter.

107. A process for manufacturing tyres, the process comprising the steps of:
    engaging auxiliary support members with a building drum, each of said auxiliary support members having at least one circumferential rest surface extending in a continuation of the outer circumferential surface of the building drum;
    applying at least one carcass ply according to an application diameter around at least one outer surface of said building drum, said at least one carcass ply having axially opposite end flaps;
    releasing said auxiliary support members from the building drum;
    after releasing said auxiliary support members from the building drum, coaxially engaging around each of the end flaps, an annular anchoring structure defining a fitting diameter smaller than said application diameter so as to make a carcass sleeve;
    positioning an outer sleeve comprising at least one belt structure at a coaxially centered position around said carcass sleeve applied onto said building drum;
    shaping said carcass sleeve from the application diameter into a toroidal configuration to apply said carcass sleeve against a radially internal surface of said outer sleeve; and
    engaging locking members to the building drum, after coaxially engaging said annular anchoring structures and before shaping said carcass sleeve,
    moving a circumferentially continuous annular thrust ring carried by each of said locking members in an axial direction into direct contact with an elastically deformable annular element carried by each of said locking members to deform the annular element from a rest condition to a radially expanded condition against each of the annular anchoring structures,
    wherein the locking members do not engage the annular anchoring structures when coaxially engaging the annular anchoring structures around the end flaps,
    wherein the annular anchoring structures are locked relative to the building drum during the shaping step by said locking members,
    wherein said locking members are disengaged from the building drum after shaping said carcass sleeve, and
    wherein the at least one outer surface of the building drum has a same diameter when the at least one carcass ply is applied, when the annular anchoring structures are coaxially engaged around the end flaps, and when the locking members are engaged to the building drum.

108. A process for manufacturing tyres, the process comprising the steps of:
    engaging auxiliary support members with a building drum, each of said auxiliary support members having at least one circumferential rest surface extending in a continuation of the outer circumferential surface of the building drum;
    applying at least one carcass ply according to an application diameter around at least one outer surface of said building drum, said at least one carcass ply having axially opposite end flaps;
    releasing said auxiliary support members from the building drum;
    after releasing said auxiliary support members from the building drum, coaxially engaging around each of the end flaps, an annular anchoring structure defining a fitting diameter smaller than said application diameter so as to make a carcass sleeve;
    transferring the building drum carrying the carcass sleeve from a building station to a shaping station;
    at the shaping station, positioning an outer sleeve comprising at least one belt structure at a coaxially centered position around said carcass sleeve applied onto said building drum;
    at the shaping station, shaping said carcass sleeve from the application diameter into a toroidal configuration to apply said carcass sleeve against a radially internal surface of said outer sleeve; and
    at the shaping station, engaging locking members to the building drum, after coaxially engaging said annular anchoring structures and before shaping said carcass sleeve,
    moving a circumferentially continuous annular thrust ring carried by each of said locking members in an axial direction into direct contact with an elastically deformable annular element carried by each of said locking members to deform the annular element from a rest condition to a radially expanded condition against each of the annular anchoring structures,
    wherein the locking members do not engage the annular anchoring structures when coaxially engaging the annular anchoring structures around the end flaps,
    wherein the annular anchoring structures are locked relative to the building drum during the shaping step by said locking members,
    wherein said locking members are disengaged from the building drum after shaping said carcass sleeve, and
    wherein the at least one outer surface of the building drum has a same diameter when the at least one carcass ply is applied, when the annular anchoring structures are coaxially engaged around the end flaps, and when the locking members are engaged to the building drum.

\* \* \* \* \*